US00RE35130E

United States Patent [19]

Hanna

[11] E Patent Number: Re. 35,130

[45] Reissued Date of Patent: Dec. 26, 1995

[54] CIRCULAR SLIVER KNITTING MACHINE HAVING INCREASED CARDING CAPACITY

[75] Inventor: Joseph C. Hanna, Lynchburg, Va.

[73] Assignee: Mayer Industries, Inc., Orangeburg, S.C.

[21] Appl. No.: 278,933

[22] Filed: Jul. 22, 1994

Related U.S. Patent Documents

Reissue of:

[64] Patent No.: 5,134,863
Issued: Aug. 4, 1992
Appl. No.: 697,989
Filed: May 10, 1991

[51] Int. Cl.[6] ..... D04B 9/14; F16C 33/61

[52] U.S. Cl. ..... 66/9 B; 384/607; 384/614

[58] Field of Search ..... 66/8, 9 B, 9 R; 384/607, 614, 615

[56] References Cited

U.S. PATENT DOCUMENTS

| | | | |
|---|---|---|---|
| 796,871 | 8/1905 | Sachs . | |
| 1,213,089 | 1/1917 | Fox . | |
| 2,545,122 | 3/1951 | Thompson | 384/615 |
| 2,712,482 | 7/1955 | Featonby | 384/615 |
| 2,733,967 | 2/1956 | Jones, Jr. | 384/615 |
| 2,978,915 | 4/1961 | Metcalf | 384/507 X |
| 3,030,158 | 4/1962 | Pöhler | 384/615 |
| 3,061,389 | 10/1962 | Bargmann | 384/615 |
| 3,099,073 | 7/1963 | Olson | 384/615 X |
| 3,482,892 | 12/1969 | Schluter et al. | 384/615 |
| 4,006,609 | 2/1977 | Abler | 66/9 B |
| 4,007,607 | 2/1977 | Christiansen et al. | 66/9 B |
| 4,245,487 | 1/1981 | Schaab et al. | 66/9 B |
| 4,258,557 | 3/1981 | Kunde et al. | 66/9 B |
| 4,345,446 | 8/1982 | Schäberle | 66/9 B |
| 4,408,371 | 10/1983 | Quay | 66/9 R X |
| 4,489,573 | 12/1984 | Engelfield | 66/8 |
| 4,541,744 | 9/1985 | Lederman | 384/614 |
| 4,592,213 | 6/1986 | Tilson et al. | 66/9 B |
| 4,696,586 | 9/1987 | Krug | 384/615 X |
| 4,778,287 | 10/1988 | Jacob et al. | 384/615 X |
| 4,797,008 | 1/1989 | Helbig et al. | 384/49 |
| 4,906,113 | 3/1990 | Sague | 384/507 X |
| 5,071,264 | 12/1991 | Franke et al. | 384/615 X |
| 5,211,033 | 5/1993 | Chen | 66/8 |

FOREIGN PATENT DOCUMENTS

| | | | |
|---|---|---|---|
| 1274898 | 9/1981 | France | 384/615 |
| 1042976 | 11/1978 | Germany | 384/615 |
| 0356320 | 9/1981 | Switzerland | 384/615 |
| 1200451 | 7/1970 | United Kingdom . | |
| 2126667 | 3/1984 | United Kingdom . | |

*Primary Examiner*—John J. Calvert
*Attorney, Agent, or Firm*—Bell, Seltzer, Park & Gibson

[57] ABSTRACT

There is disclosed an improved circular sliver knitting machine having increased carding capacity for increasing the amount of sliver which can be carded and fed into the knitting machine. A mounting ring is fixed on an upper bed plate fixed to the sliver knitting machine frame. A plurality of sliver feed assemblies are supported on a sliver feed mounting plate secured to the upper bed plate. The sliver feed assemblies interconnect to a ring gear mounted in surrounding spaced relation to the mounting ring. The sliver feed assemblies card and feed sliver yarn to the knitting needles as the ring gear is turned. A bearing assembly for allowing rotation of the ring gear relative to the mounting ring while withstanding radial and tangential loads imparted on the ring gear includes at least one wire race extending along the outer surface of the mounting ring and at least one wire race extending along the inner surface of the ring gear. A plurality of ball bearings engage the wire races for rolling along the wires as the ring gear is turned.

67 Claims, 4 Drawing Sheets

CIRCULAR SLIVER KNITTING MACHINE HAVING INCREASED CARDING CAPACITY

Matter enclosed in heavy brackets [ ] appears in the original patent but forms no part of this reissue specification; matter printed in italics indicates the additions made by reissue.

FIELD OF THE INVENTION

This invention relates to a circular sliver knitting machine having increased carding capacity for increasing the amount of sliver fed to the knitting needles, and more particularly, this invention relates to a circular sliver knitting machine having an improved bearing assembly mounted between the mounting ring and ring gear positioned on the upper bed plate for allowing greater power to be imparted onto the ring gear and sliver feed assemblies to increase carding capacity.

BACKGROUND OF THE INVENTION

In a conventional circular sliver knitting machine, the knitting machine drive mechanism imparts tremendous forces onto the sliver feed assemblies which card and feed sliver fiber into the knitting needles. The sliver feed assemblies are mounted in surrounding relation to the needle cylinder and are connected to a ring gear supported in a mounting channel of the upper bed plate. The ring gear is slidable on a mounting ring fixed in the mounting channel.

As the ring gear turns, the sliver feed assemblies are actuated for carding and feeding sliver into the knitting needles. Compared to a conventional circular knitting machine, the knitting needles in a sliver knitting machine move a more extended distance because the knitting needles must extend vertically into the doffing roll of the sliver feed assemblies. At the same time, the ring gear must rotate with precision in a circular pattern to ensure that the forces generated on each of the sliver feed assemblies is substantially equal. Any bearing assembly positioned between the ring gear and mounting ring not only must maintain ring gear movement in a circular pattern, but also must withstand the tremendous forces generated during knitting.

Because of the large diameter of most sliver knitting machines, conventional two-point contact ball bearing assemblies having inner and outer races have not been used between the ring gear and mounting ring of these machines. The bearing assembly between the ring gear and mounting ring requires a small cross section, and manufacturers find it difficult and expensive to manufacture conventional races having the required large diameter and small cross section.

Additionally, under increased load conditions, such as when thick sliver is carded and fed, the internal stresses in the conventional two-point contact ball bearing races increase. These forces tend to produce internal stresses on the bearings. As a result, either the bearings fail, or the ring gear travels in somewhat of an elliptical pattern instead of the desired circular pattern. When this occurs, the precise, predetermined adjustments between the knitting needles and doffing rolls change creating improper carding, feeding and knitting of the sliver fiber.

To avoid the problems associated with conventional ball bearings and races, conventional sliver knitting machines use a hydrodynamic bearing comprising a plurality of bronze friction elements immersed in oil between the ring gear and mounting ring. These bronze elements can be machined to close tolerances to fit within the bearing channel between the mounting ring and ring gear. However, hybrodynamic bearings create problems because the bronze, friction elements are immersed in oil and spaced from the mounting ring and ring gear to create an open area for the oil. When the sliver knitting machine is under a high load, such as when heavy sliver is carded and fed, the bronze elements move in an undesired elliptical pattern. Thus, the amount of force which can be exerted onto the ring gear and needles is limited, resulting in not only limiting the amount of sliver which can be fed to the knitting needles, but also limiting the number of feeds and the speed at which the sliver knitting machine can operate.

Another drawback of the conventional sliver knitting machine is the repeating occurrence of oil being blown out of the mounting channel. An annular air jet channel is mounted adjacent the mounting ring and a sliver feed mounting plate, also known as card support ring, covers the channels and supports the sliver feed assemblies. The air jet channel provides an air flow to a plurality of air jet mechanisms forming a part of the sliver feed assemblies. A sealing compound positioned between the upper bed plate and the sliver feed mounting plate prevents air forced into the air jet channel from passing into the mounting channel and blowing the oil out of the channel. However, the sealing compound often degrades and contracts after continual machine use resulting in air blowing from the air jet channel into the mounting channel. As a result, the bearing oil is forced out of the mounting channel and the bearing assembly fails. A second, vented annular chamber or other means adjacent the air jet channel is preferred for allowing venting of that leaking air.

SUMMARY OF THE INVENTION

It is therefore an object of the present invention to provide a circular sliver knitting machine which has an increased carding capacity for increasing the amount of sliver which can be fed to the knitting needles.

It is another object of the present invention to provide a circular sliver knitting machine which has an improved bearing assembly positioned between the ring gear and mounting ring for allowing increased loads to be imparted on the ring gear to increase the amount of sliver carded and fed by the sliver feed assemblies to the knitting needles.

It is another object of the present invention to provide a circular sliver knitting machine which has sliver feed assemblies of increased capacity for increasing the amount of sliver carded and fed to the knitting needles.

It is another object of the present invention to provide a circular sliver knitting machine having a bearing assembly positioned between the mounting ring and ring gear which allows increased driving forces to be exerted on the ring gear without bearing distortion.

It is another object of the present invention to provide a circular sliver knitting machine providing means for venting of air leaking from the air jet channel inward toward the mounting channel.

In accordance with the present invention the circular sliver knitting machine has a frame and a needle cylinder rotatably supported on the frame. A plurality of needles are supported in the needle cylinder for vertical movement parallel to the axis of rotation of the needle cylinder. An upper bed plate is fixed on the frame in surrounding relation to the needle cylinder. A mounting ring is fixed on the upper bed plate. A ring gear surrounds the mounting ring in spaced relation thereto. A bearing assembly using wire race and ball bearing components is engaged with the outer peripheral surface of the mounting ring and the inner peripheral surface of the ring gear for allowing the ring gear to rotate relative to the stationary mounting ring. A sliver feed mounting plate is secured to the bed plate and overlies the mounting ring and ring gear. Conventional drive means rotates the ring gear.

The bearing assembly includes wire races extending along the outer surface of the mounting ring and wire races extending along the inner surface of the ring gear. A plurality of ball bearings engage the wire races for rolling along the wire races as the ring gear rotates. A plurality of sliver feed assemblies supported by the upper bed plate connect to the ring gear for feeding sliver yarn to the knitting needles as the ring gear turns.

In a preferred embodiment, an annular mounting channel is positioned along the inner peripheral portion of the bed plate adjacent the needle cylinder. The mounting ring and ring gear are positioned in the mounting channel and immersed in oil. The mounting ring and the ring gear include confronting recesses which form a bearing channel in which the bearing assembly is mounted.

Preferably, the bearing assembly comprises an upper and lower wire race extending through each recess. Looking in cross-section, the wire races form a square configuration. A bearing retainer is positioned within the bearing channel between upper and lower wire races. A plurality of openings are formed in the retainer and a ball bearing is positioned in a plurality of the openings. The bearing retainer includes inner and outer sections and a plurality of arcuate sections. The bearing channel includes a widened, access opening in which the wire races can be deflected for inserting and removing ball bearings from the retainer openings. Removable plates cover the bearing channel opening.

In a preferred embodiment, the upper bed plate includes an annular air jet channel positioned radially outward from the mounting channel. A plurality of air discharge orifices are positioned in the sliver feed mounting plate and communicate with the air jet channel. A plurality of air jet mechanisms are mounted on the sliver feed mounting plate and communicate with the discharge orifices for forcing air fed into the air jet channel into the air jet mechanisms onto sliver fed into the knitting needles. Another annular channel is positioned between the annular mounting channel and the air jet channel. A plurality of air vents are positioned in the sliver feed mounting plate and communicate with the annular channel positioned between the mounting and air jet channels for allowing venting of air passing from the air jet channel and under the sliver feed mounting plate to prevent the air from blowing oil from the mounting channel.

BRIEF DESCRIPTION OF THE DRAWINGS

Some of the objects and advantages of this invention having been set forth above, other objects and advantages will appear as the description proceeds, when taken in conjunction with the accompanying drawings, in which.

DETAILED DESCRIPTION OF THE PREFERRED EMBODIMENT

Figure 1:
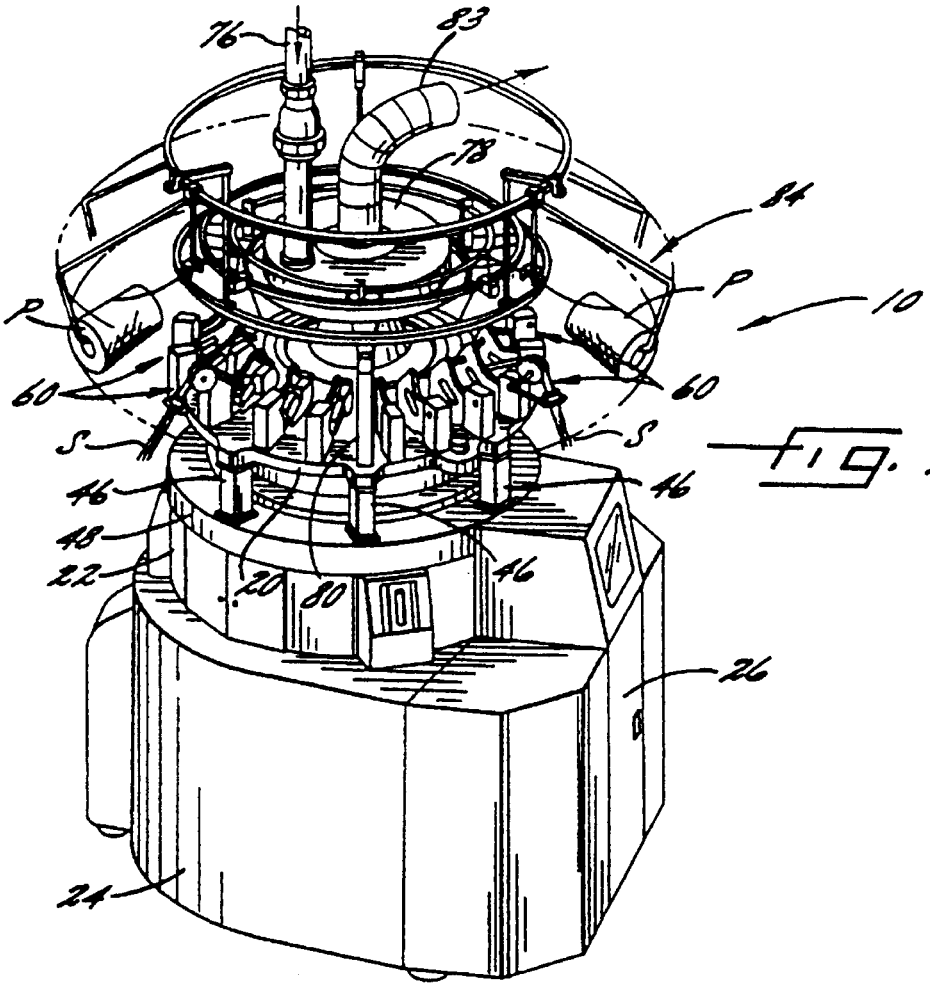
FIG. 1 is an isometric view of the circular sliver knitting machine in accordance with the present invention.

Referring now to the drawings, and more particularly to FIG. 1, there is illustrated at 10 a circular, silver knitting machine in accordance with the present invention.

As shown in FIG. 1, the knitting machine includes a frame, indicated generally at 22. The frame 22 includes a housing 24 for covering the structural, floor-engaging members of the frame. The housing has door openings 26 for gaining access to the working components of the knitting machine 10. As shown in greater detail in FIG. 3, needle cylinder 28 is rotatably supported on the frame 22. A drive motor (not shown) is supported on the frame 22 and includes a vertical drive shaft 32 having a lower drive pinion 34 connecting to the needle cylinder 28 for rotating the needle cylinder when the drive motor is actuated.

Figure 3:
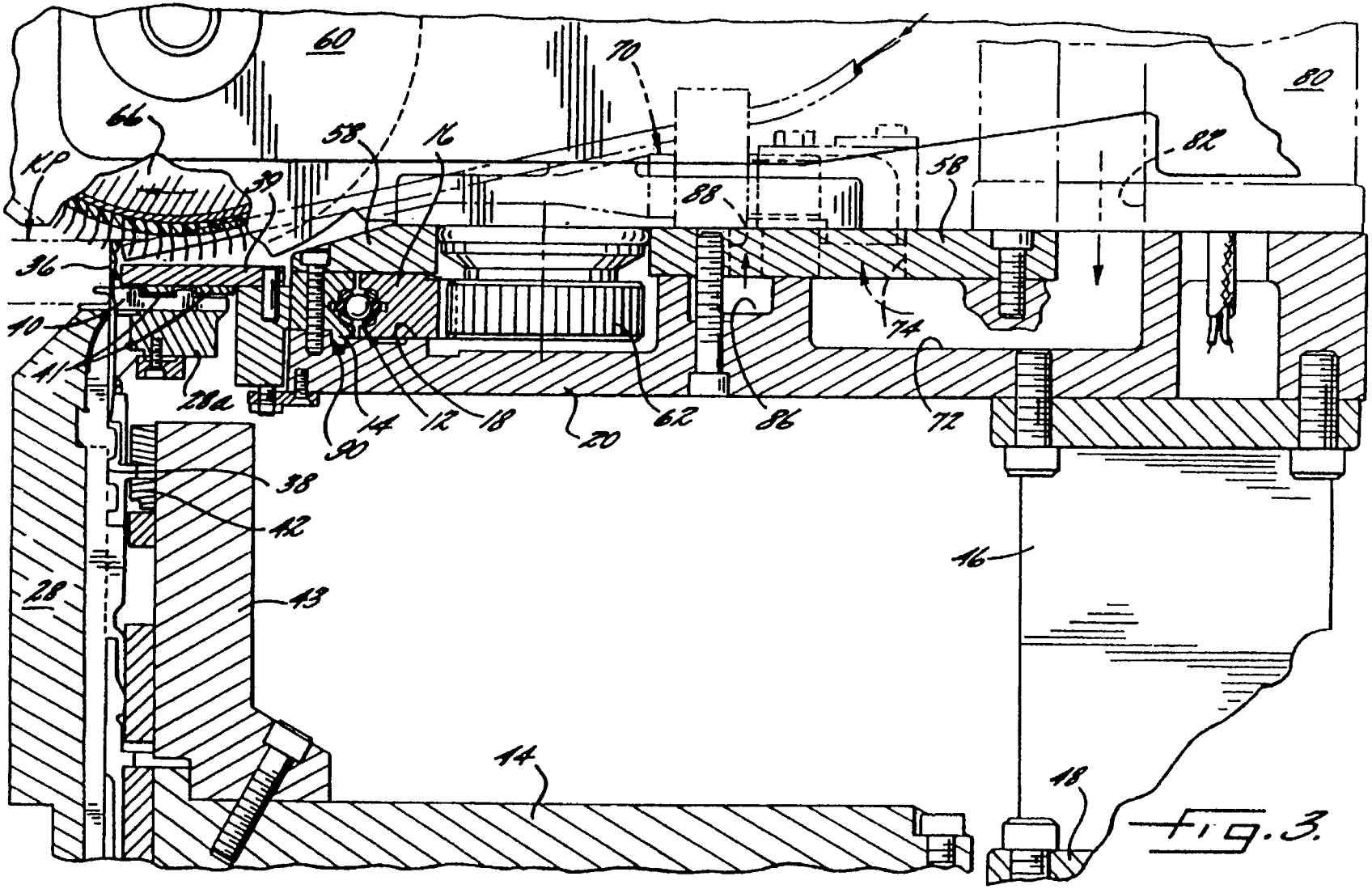
FIG. 3 is a sectional view taken along line 3—3 of FIG. 2 after the exploded, illustrated parts are assembled.

A plurality of needles 36 are supported in grooves in the needle cylinder 28 for vertical movement parallel to the axial rotation of the needle cylinder 28. (FIG. 3). The needles 36 include butts 38 for engaging cams 42 mounted on cam plate members 43 fixed on a cam support ring 44. When the needle cylinder 28 rotates, the needle butts 38 engage the cams 42 and move the needles 36 from the lowered, stitch forming position to a raised position. This raised needle position defines the upper surface of the knitting plane of the machine shown by the arrow marked KP in FIG. 3. At the raised position, the knitting needles extend into a doffing roll for grasping carded sliver and lowering the sliver to a stitch forming level. A sinker support ring 39 is secured to the upper bed frame. Sinkers 40 are mounted on the dial 28a of the needle cylinder. Fixed sinker cams 41 engage sinker butts and move the sinkers 40 in and out as the dial 28a rotates.

An upper bed plate 20 is fixed on six, evenly spaced frame support members 46 extending upwardly from a lower frame plate 48. An annular mounting channel 18 is positioned along the inner peripheral bed portion of the bed plate 20 adjacent the needle cylinder 28 (FIG. 2) and a mounting ring 14 is secured within the annular mounting channel 18. A ring gear 16 surrounds the mounting ring 14 in spaced relation.

A bearing assembly 12 engages the outer peripheral surface of the mounting ring 14 and the inner peripheral surface of the ring gear 16 for allowing the ring gear 16 to rotate relative to the stationary mounting ring 14. First and second drive pinions 50, 52 are rotatably fixed in an offset 54 of the mounting channel 14. The second drive pinion 52 engages the gear teeth of the ring gear 16, and the first drive pinion 50 engages an upper pinion 56 fixed on the motor drive shaft 32 extending upward through the bed plate 20.

Figure 4:
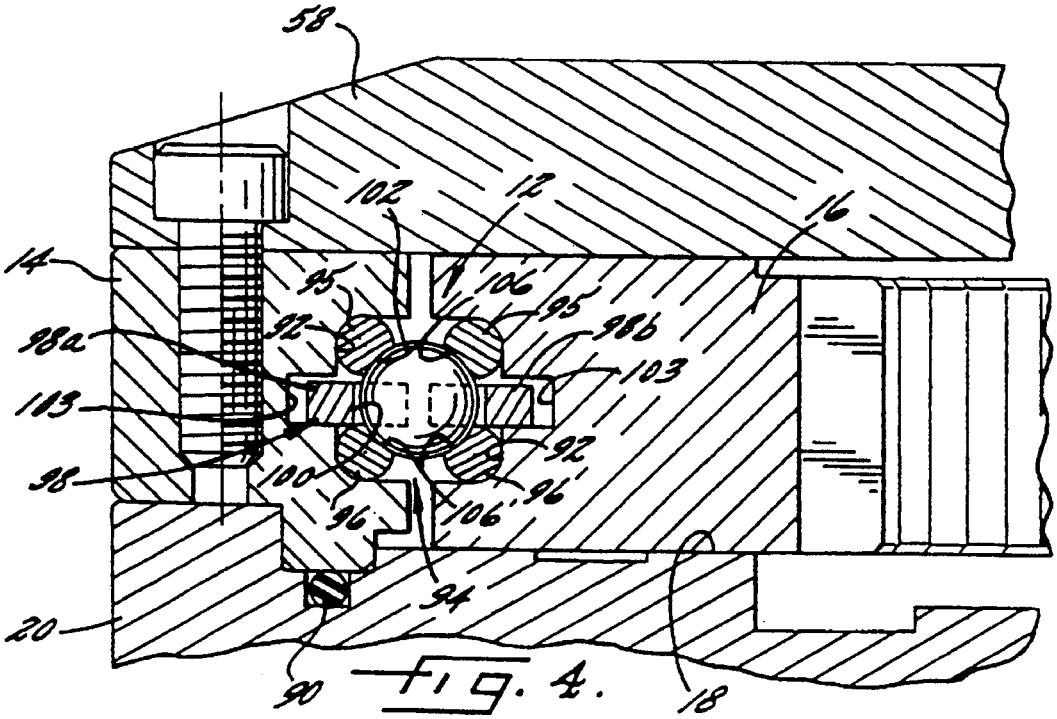
FIG. 4 is an enlarged, sectional view of the bearing assembly mounted in the bearing channel formed between the mounting ring and ring gear.

A sliver feed mounting plate 58, also known as a card support ring, is secured by bolts (FIG. 4) to the upper surface of the bed plate and overlies the mounting ring 14 and ring gear 16. The sinker cams 41 are fixed to a sinker cam ring 39 secured to the sliver feed mounting plate 58 (FIG. 4). A plurality of sliver feed assemblies 60 are mounted in evenly spaced relation on the sliver feed mounting plate 58. In the preferred embodiment, there are eighteen sliver feed assemblies 60 positioned around the needle cylinder (FIG. 1).

Each sliver feed assembly 60 includes a drive pinion 62 extending downwardly from the assembly through an opening of the sliver feed mounting plate to engage the ring gear 16 (FIG. 3). Each sliver feed assembly 60 serves a carding function as it feeds the slivers to the knitting needles. Each sliver feed assembly includes a guide roll mechanism 64 for guiding sliver into the assembly. As shown in FIG. 3, a doffing roll 66 is rotatably mounted in the assembly and connects the drive pinion 62 by a transmission mechanism (not shown) so that as the ring gear 16 turns and rotates the drive pinion 62, the doffing roll 66 is rotated not only for carding the sliver, but also for feeding the carded sliver to the knitting needles. The doffing roll 66 is positioned on the mounting plate 58 a predetermined distance from the knitting plane to assure proper carding and feeding of the sliver into the knitting needles. A sliver feed apparatus of the type disclosed in U.S. Pat. No. 4,592,213 to Tilson, and assigned to Mayer, Wildman Industries, Inc., assignee of the present patent application, illustrates one type of sliver feed apparatus which may be used in the present invention.

Figure 2:
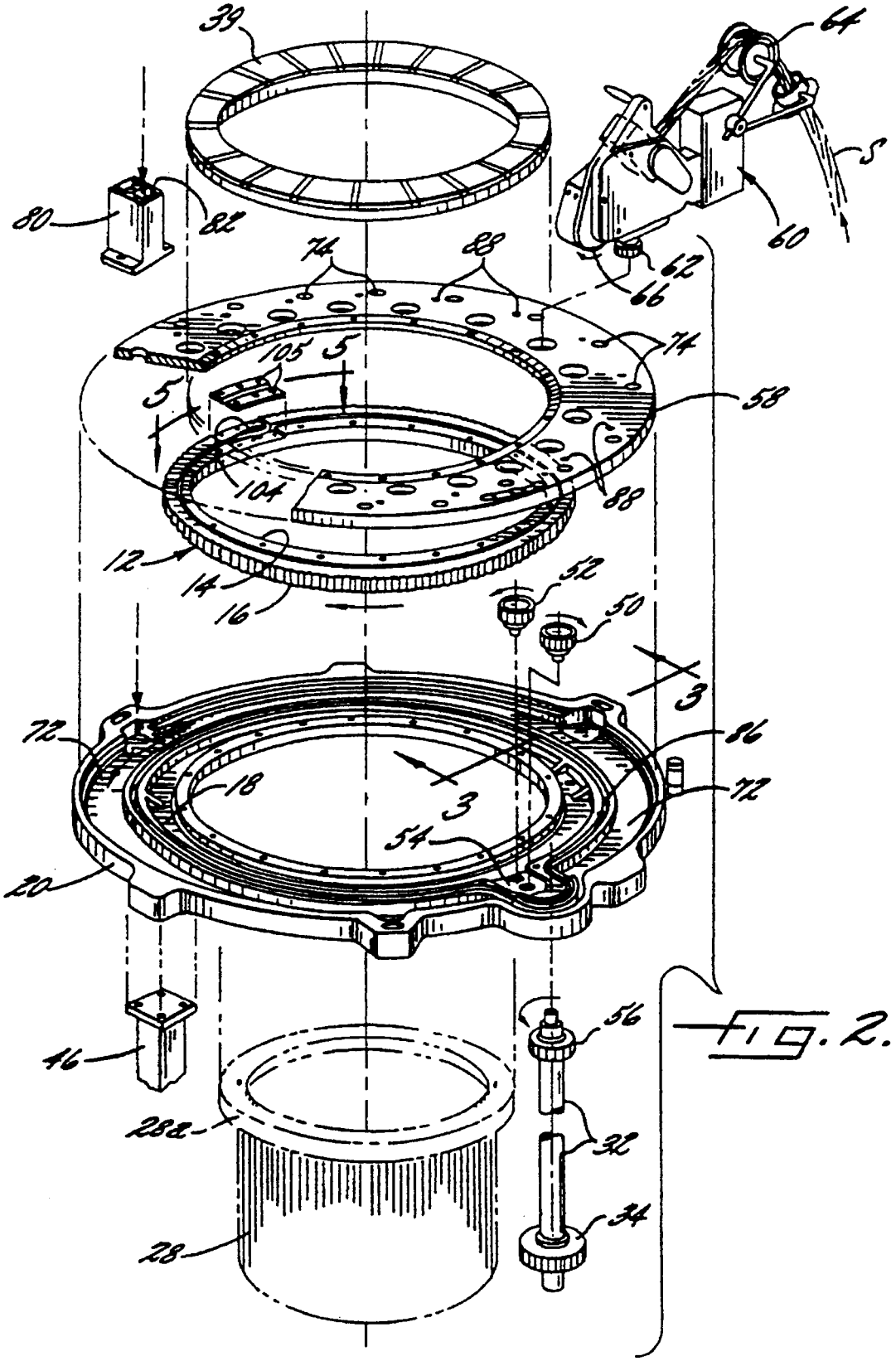
FIG. 2 is an exploded isometric view of the needle cylinder, upper bed plate, sliver feed mounting plate, the ring gear and mounting ring, and showing the widened, access opening of the bearing channel.

Each sliver feed assembly 60 also includes an air jet mechanism, indicated generally at 70, for blowing a high pressure air onto the sliver as it is carded (FIG. 3). As illustrated in FIGS. 2 and 3, the upper bed plate 20 includes an annular air ]et channel 72 positioned radially outward from the mounting channel 18. Air discharge orifices 74 are positioned in the sliver feed mounting plate 58 at each position in which a sliver feed assembly 60 is mounted on the plate. The orifices 74 communicate with the air jet mechanisms 70 (FIG. 3) and a blower or other air source (not shown) forces air into an air intake tube 76 connected to an air jet plenum chamber 78 supported on three support legs 80 (FIG. 1). Each support leg 80 includes an air channel 82 communicating with the air plenum chamber 78 and air jet channel 72. Air forced into the plenum chamber 78 is then forced through the legs 80 and into the air jet channel 72 where it is drawn outward through the air orifices 74 and into the air jet mechanisms 70 to provide a jet of forced, blowing air onto the sliver. The air is discharged through an air discharge tube 83. A conventional creel assembly 84 is supported on the air plenum chamber legs 80. The creel assembly 84 includes packages P of yarn which are knit with the sliver which is drawn downward through the sliver feed assemblies 60 into the knitting needles 36.

As illustrated in FIGS. 2 and 3, the upper bed plate 20 includes an annular atmosphere venting channel 86 positioned between the mounting channel 18 and the air jet channel 72. Air outlet orifices 88 are positioned in the sliver feed mounting plate 58 and communicate with the atmosphere channel 86. This atmosphere channel 86 provides for venting of air which may leak past the seal formed between the sliver feed mounting plate 58 and the upper bed plate 20. In prior art sliver knitting machines, the air jet channel 72 is adjacent the mounting channel 18. The area between the two channels 72, 18, i.e. the juncture between the upper bed plate 20 and the sliver feed mounting plate 58 includes a sealing compound for preventing air blown into the air jet channel 72 from passing between the upper bed plate 18 and sliver feed mounting plate 58 into the mounting channel 18. If air Were blown into the mounting channel 18, the oil would be blown out of the channel, and the bearings would deform. However, users of the machine have found that over time, the sealing compound weakens and contracts. As a result, in prior art sliver knitting machines, air does pass into the mounting channel 18 resulting in the oil being blown from the mounting channel. The atmosphere channel 86 in accordance with the present invention provides for venting of air leaking past the seal of the air jet channel 72.

As illustrated now in greater detail in FIG. 4, the improved bearing assembly 12 in accordance with the present invention is shown in enlarged detail. The bearing assembly 12 is immersed in oil contained within the mounting channel 18. An O-ring seal 90 underlies the mounting ring 14 for preventing oil from passing under the mounting ring 14 into other portions of the knitting machine.

Figure 5:
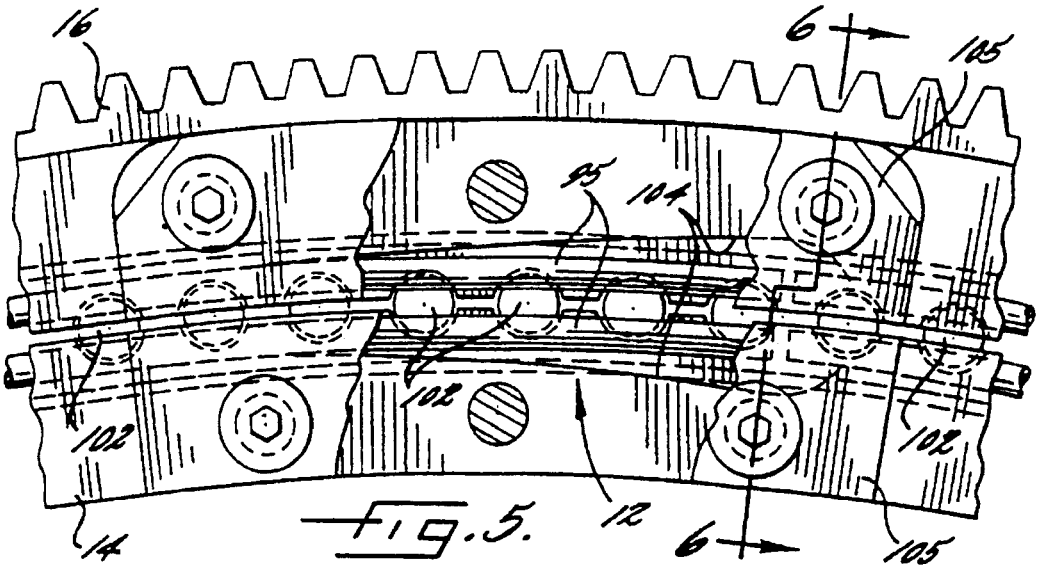
FIG. 5 is a partial plan view of the mounting ring and ring gear showing the widened, exposed opening of the bearing channel in which wire races can be deflected for inserting and removing ball bearings from the retainer openings.
Figure 6:
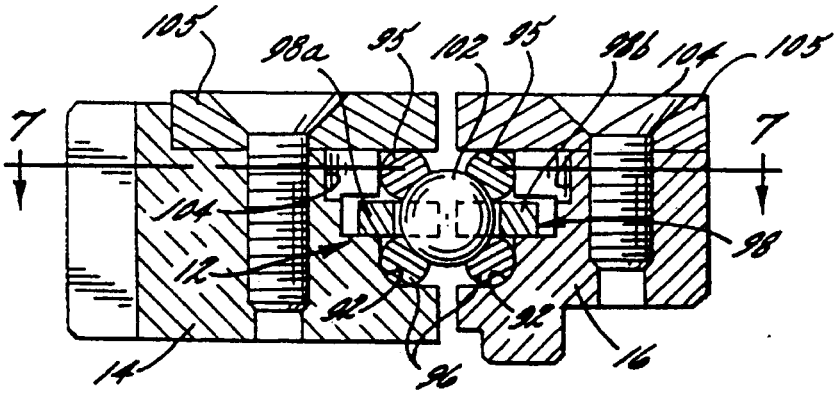
FIG. 6 is a sectional view taken along line 6—6 of FIG. 6.
Figure 7:
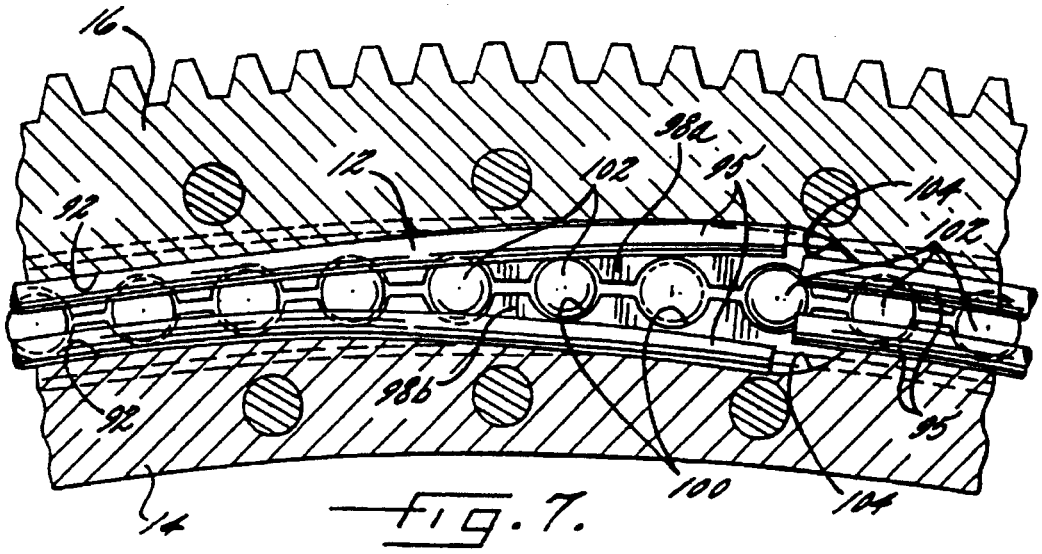
FIG. 7 is another view similar to FIG. 5 showing the wire races deflected and a ball bearing removed from a retainer opening.

The mounting ring 14 and ring gear 16 include confronting, substantially rectangular-configured recesses 92 forming a substantially rectangular-configured bearing channel 94. Upper and lower wire races 95, 96 extend circumferentially through each recess 92 along the peripheral portions of the respective ring gear 16 and mounting ring 14. A bearing retainer, indicated generally at 98, is positioned within the bearing channel 94 between upper and lower wire races 95, 96. The retainer 98, or "cage", includes openings 100 formed therein in Which ball bearings 102 are inserted. The ball bearings 102 engage the Wire races 95, 96 for rolling movement relative to the wire races as the ring gear 16 turns. The retainer 98 ("cage") is preferably formed of phenolic material in longitudinal arcuate segments which are split longitudinally into inner and outer sections 98a, 98b (FIGS. 4 and 6) to facilitate assembly of the bearing. The preferred phenolic material is an oil resistant Type-L resin which has a low coefficient of thermal expansion. Bearing retainer grooves 103 extend along the medial portion of the recesses 92. The side portions of the retainer 98 are received into the grooves 103. As shown in FIGS. 5 and 7, the bearing channel 94 includes a widened, access opening 104 in which the top wire races 95 can be deflected for inserting and removing ball bearings 102 from the retainer openings 100. The wire races may deflect sufficiently for insertion or removal of rolls and the resiliency of the wire races 95 will cause them to return to a ball holding position after such deflection. Mounting ring and ring gear coupler plates 105 are bolted over the opening to retain the ball bearings between the wire races (FIG. 6).

In a preferred embodiment, each wire race 95, 96 is a 4 dia.×3.14 mm wire which is machined on an arcuate surface with a profiled surface forming a groove (recess) 106 having a radius slightly larger than the preferred 8 mm ball bearing radius to create an 11.27 millimeter square envelope from wire-to-wire. The wire races extend through the bearing channel 94 in a circular pattern. The gap between adjacent ends of each wire race 95, 96 is no more than one third of the wire diameter, i.e., no more than one 1.67 mm.

METHOD OF OPERATION

The bearing assembly 12 is inserted into the machine 10 by first placing the bottom wire races 96 within the bearing channel 94. The inner and outer retainers 98a, 98b are positioned within the bearing channel 94, and the top wire races 95 are positioned within the channel. The wire races 95, 96 are deflected at the access opening 104 and a ball bearing 102 is inserted within the retainer opening 100. The drive motor is actuated for slightly rotating the needle cylinder 28 and ring gear 16 to move the next retainer opening 100 adjacent the access opening 104. A second ball bearing 102 then is inserted into the retainer opening 100 adjacent the access opening. Each arcuate section is filled except for one retainer opening, which preferably is left empty.

To begin knitting, the drive motor is actuated for turning the motor output drive shaft 32 which rotates the drive pinions 34, 50, 52 and 56 connected to the needle cylinder 28 and ring gear 16. The ring gear 16 rotates the sliver feed assembly drive pinions 62 which, in turn, rotate the doffing rolls 66 to feed sliver into the knitting needles positioned in the rotating needle cylinder 28. The ball bearings 102 roll relative to the race wires 95, 96 as the ring gear 16 is rotated. Any distortion in the profiled grooves 106 of the wire races, such as created during machining, is compensated by the wires slightly rotating on the ball bearings 102.

The bearing assembly 10 of the present invention not only is adapted for use with new manufactured sliver knitting machines, but also is adapted for retrofit of conventional sliver knitting machines having a mounting ring, ring gear and conventional hydrodynamic bearing composed of bronze bearing elements immersed in oil in a bearing channel between the ring gear and mounting ring. The low vertical height of the bearing assembly 10 allows insertion of the bearing components between the existing ring gear and mounting ring of sliver knitting machines.

The design of the bearing assembly with wire races and ball bearings resists deformation and provides continual contact without excess clearance to allow greater forces to be exerted on the ring gear. Thus, the overall capacity of each sliver feed assembly may be increased because high tangential and radial loads may be imparted onto the ring gear. Additionally, the profiled recess on the wire races provides for a four-point contact and more stable control over ball bearing movement relative to the wire races, thus preventing excessive play among the ball bearings and wire races. The wire races also rotate slightly on the ball bearings maintaining at all times a four-point contact.

The improved invention has many advantages. For example, heavy fabric can be constructed at high production rates. Prior to the development of the present invention, heavy sliver was fed to sliver knitting machines at slow production speeds with only a minimal number of card feeders. With more modern machines, eighteen feeders have been used. The feeding and carding units, however, could not operate at full capacity. Without the present invention, on one sliver knitting machine, the conventional 0.2 horsepower sliver feed assemblies were not operated at full capacity because the forces imposed on the ring gear at full operating capacity created bearing wear and eccentricity of ring movement. In the present invention, these feeders were replaced with 0.4 horsepower sliver feed assemblies resulting in a three hundred percent in production.

The present invention also allows use of longer staple length fibers. In conventional sliver knitting machines operating at 55 revolutions per minute, 1.5 pounds per meter of 1⅛ inch staple length sliver was the limit at which the machines could be run. Processing longer staple length fibers on the conventional sliver knitting machines increased the load exerted on the ring gear bearing resulting in bearing failure or the ring gear traveling in an undesired elliptical pattern. Now with the present invention, five pounds per meter of 1⅛ inch to as high as 2½ inch staple length fiber can be run on the above mentioned sliver knitting machines operating at 55 revolutions per minute. Not only is production and carding capacity increased, but also a high quality fabric may can be produced.

In the drawings and specification, there has been set forth a preferred embodiment of this invention, and although specific terms are employed, they are used in a generic and descriptive sense only and not for purposes of limitation.

That which is claimed is:

1. A circular sliver knitting machine having increased carding capacity for increasing sliver to be carded and fed into the knitting machine comprising a frame, a needle cylinder rotatably supported on said frame, a plurality of needles supported in the needle cylinder for vertical movement parallel to an the axis of rotation of the needle cylinder, an upper bed plate fixed on said frame in surrounding relation to said needle cylinder, a mounting ring fixed on said upper bed plate, a ring gear surrounding said mounting ring in spaced relation thereto, a bearing assembly engaged with an outer peripheral surface of said mounting ring and an inner peripheral surface of said ring gear for allowing said ring gear to rotate relative to said stationary mounting ring, said bearing assembly including wire races extending along the outer surface of said mounting ring and wire races extending along the inner surface of said ring gear, and a plurality of ball bearings engaging said wire races for rolling movement relative to said wires as said ring gear is rotated, drive means connected to said mounting ring for turning said mounting ring, and a plurality of sliver feed assemblies supported by said upper bed plate and interconnected to said ring gear for carding and feeding sliver yarn to said knitting needles as said ring gear is turned.

2. A sliver knitting machine according to claim 1 wherein said bearing assembly includes a bearing retainer having a plurality of spaced openings in which ball bearings are positioned.

3. A sliver knitting machine according to claim 2 wherein at least one of the spaced openings does not includes a ball bearing positioned therein.

4. A sliver knitting machine according to claim 2 wherein said bearing retainer includes inner and outer sections.

5. A sliver machine according to claim 2 herein said bearing retainer includes a plurality of arcuate sections.

6. A sliver knitting machine according to claim 1 wherein said wire races include profiled surfaces engaging the ball bearings.

7. A sliver knitting machine according to claim 6 wherein said profiled surfaces of said wire races each form an arcuate groove having a radius greater than the ball bearing radius.

8. A sliver knitting machine according to claim 1 including an upper and lower wire race extending along the outer surface of said mounting ring, and an upper and lower wire race extending along the inner surface of the ring gear and wherein said wire races are configured in a square when viewed in cross-section and said ball bearings are positioned between said wire races.

9. A sliver knitting machine according to claim 1 wherein said outer surface of said mounting ring and said inner surface of said ring gear are recessed to form a bearing channel receiving said wire races and said ball bearings.

10. A sliver knitting machine according to claim 9 wherein said bearing channel includes a widened access opening in which the wire races can be deflected for inserting and removing the ball bearings.

11. A sliver knitting machine according to claim 10 including means removably covering the bearing channel opening.

12. A sliver knitting machine according to claim 1 wherein said wire races have end portions confronting each other.

13. A circular sliver knitting machine having increased carding capacity for increasing sliver to be carded and fed into the knitting machine comprising a frame, a needle cylinder rotatably supported on said frame, a plurality of needles supported in the needle cylinder for vertical movement parallel to an axis of rotation of the needle cylinder, an upper bed plate fixed on said frame in surrounding relation to said needle cylinder, a mounting ring fixed on said upper bed plate, a ring gear surrounding said mounting ring in spaced relation thereto, said mounting ring and ring gear including confronting recesses forming a bearing channel, a bearing assembly mounted within said bearing channel for allowing said ring gear to rotate relative to said mounting ring, said bearing assembly comprising an upper and lower wire race extending circumferentially through each recess, a bearing retainer positioned within said bearing channel between upper and lower wire races, a plurality of openings formed in the retainer, a ball bearing positioned in a plurality of said openings and engaging said wire races for rolling movement relative to said wire races as said ring gear is rotated, drive means connected to said mounting ring for turning said mounting ring, and a plurality of sliver feed assemblies supported by said upper bed plate and interconnected to said ring gear for carding and feeding sliver yarn to said knitting needles as said ring gear is turned.

14. A sliver knitting machine according to claim 13 wherein said bearing retainer includes inner and outer sections.

15. A sliver knitting machine according to claim 14 wherein said bearing retainer includes a plurality of arcuate sections.

16. A sliver knitting machine according to claim 13 wherein said bearing channel includes a widened access opening in which the wire races can be deflected for inserting and removing ball bearings from the retainer openings.

17. A sliver knitting machine according to claim 16 including means removably covering the bearing channel access opening.

18. A sliver knitting machine according to claim 13 wherein said wire races have end portions confronting each other.

19. A sliver knitting machine according to claim 13 wherein said wire races include profiled surfaces engaging the ball bearings.

20. A sliver knitting machine according to claim 19 wherein said profiled surfaces of said wire races each form an arcuate groove having a radius greater than the ball bearing radius.

21. A sliver knitting machine according to claim 13 wherein said recesses are substantially rectangularly configured forming a substantial rectangular configured bearing channel.

22. A circular sliver knitting machine having increased carding capacity for increasing sliver to be carded and fed into the knitting machine comprising a frame, a needle cylinder rotatably supported on said frame, a plurality of needles supported in the, needle cylinder for vertical movement parallel to an axis of rotation of the needle cylinder, an upper bed plate fixed on said frame in surrounding relation to said needle cylinder, an annular mounting channel positioned along an inner peripheral portion of the bed plate adjacent the needle cylinder, a mounting ring secured within said annular mounting channel, a ring gear surrounding said mounting ring in spaced relation thereto, a bearing assembly engaged with an outer peripheral surface of said mounting ring and an inner peripheral surface of said ring gear for allowing said ring gear to rotate relative to said stationary mounting ring, said bearing assembly including wire races extending along the outer surface of said mounting ring and wire races extending along the inner surface of said ring gear, and a plurality of ball bearings engaging said wire races for rolling movement relative to said wire races as said ring gear is rotated, drive means connected to said mounting ring for turning said mounting ring, a sliver feed mounting plate secured to the bed plate and overlying the mounting ring and ring gear, and a plurality of sliver feed assemblies mounted on said sliver feed mounting plate and interconnected to said ring gear for carding and feeding sliver yarn to said knitting needles as said ring gear is turned.

23. A sliver knitting machine according to claim 22 wherein said upper bed plate includes an annular air jet channel positioned radially outward from said mounting channel, a plurality of air discharge orifices positioned in said sliver feed mounting plate and communicating with said air jet channel, means for forcing air into said annular air jet channels, and a plurality air jet mechanisms communicating with said discharge orifices for forcing air onto sliver fed into the knitting needles.

24. A sliver knitting machine according to claim 22 wherein said upper bed plate includes an annular atmosphere venting channel positioned between said annular mounting and air jet channels, and a plurality of air vents positioned in said sliver feed mounting plate and communicating with said annular channel portion positioned between said mounting and air jet channels for allowing venting of air passing from said air jet channel under said sliver feed mounting plate to prevent blowing of oil contained within the mounting channel adjacent the atmosphere channel.

25. A sliver knitting machine according to claim 22 wherein said bearing assembly includes a bearing retainer having a plurality of spaced openings in which ball bearings are positioned.

26. A sliver knitting machine according to claim 25 wherein said bearing retainer includes inner and outer sections.

27. A sliver knitting machine according to claim 25 wherein said bearing retainer includes a plurality of arcuate sections.

28. A sliver knitting machine according to claim 22 wherein said wire races include profiled surfaces engaging the ball bearings.

29. A sliver knitting machine according to claim 28 wherein said profiled surfaces of said wire races each form an arcuate groove having a radius greater than the ball bearing radius.

30. A sliver knitting machine according to claim 22 including an upper and lower wire race extending along the outer surface of said mounting ring, and an upper and lower wire race extending along the inner surface of the ring gear and wherein said wire races are configured in a square when viewed in cross-section and said ball bearings are positioned between said wire races.

31. A sliver knitting machine according to claim 22 wherein said outer surface of said mounting ring and said inner surface of said ring gear are recessed to form a bearing channel receiving said wire races and ball bearings.

32. A sliver knitting machine according to claim 31 wherein said bearing channel includes a widened opening in which the wire races can be deflected for inserting and removing the ball bearings.

33. A sliver knitting machine according to claim 32 including means removably covering the widened opening.

34. A sliver knitting machine according to claim 22 wherein said wire races have end portions confronting each other.

35. A sliver knitting machine having increased carding capacity for increasing sliver to be carded and fed into the knitting machine comprising a frame, a needle cylinder rotatably supported on said frame, a plurality of needles supported in the needle cylinder for vertical movement parallel to an axis of rotation of the needle cylinder from a lowered stitch forming position to a raised position defining a knitting plane on the machine an upper bed plate fixed on said frame in surrounding relation to said needle cylinder, an annular mounting channel positioned along a inner peripheral portion of the bed plate adjacent the needle cylinder, a mounting ring secured within said annular mounting channel and a ring gear surrounding said mounting ring in spaced relation thereto, said mounting ring and ring gear including confronting recesses forming a bearing channel, a bearing assembly mounted within said bearing channel for allowing said ring gear to rotate relative to said mounting ring while withstanding radial and tangential loads imported on the mounting ring and ring gear, said bearing assembly comprising an upper and lower race wire extending circumferentially through each recess, a bearing retainer positioned within said bearing channel between upper and lower race wires, a plurality of openings formed in the retainer, a ball bearing positioned in a plurality of said openings and engaging said wires for rolling movement relative to said wire races as said ring gear is rotated, drive means connected to said mounting ring for turning said mounting ring, a sliver feed mounting plate secured to the bed plate and overlying the mounting ring and ring gear, and a plurality of sliver feed assemblies mounted on said sliver feed mounting plate and interconnected to said ring gear for feeding sliver yarn to said knitting needles as said ring gear is turned, each of said sliver feed assemblies having a doffing roll positioned a predetermined distance from the knitting plane defined by the knitting needles.

36. A sliver knitting machine according to claim 35 wherein said upper bed plate includes an annular air jet channel positioned radially outward from said mounting channel, a plurality of air discharge orifices positioned in said sliver feed mounting plate and communicating with said air jet channel, means for forcing air into said air jet channel, and a plurality of air jet mechanisms communicating with said discharge orifices for forcing air onto sliver fed into the knitting needles.

37. A sliver knitting machine according to claim 36 wherein said upper bed plate includes an annular atmosphere venting channel positioned between said annular mounting channel and said second air jet channel, and a plurality of air vents positioned in said sliver feed mounting plate and communicating with said annular atmosphere venting channel for allowing venting of said mounting channel and preventing blowing of oil contained within said mounting channel adjacent the atmosphere channel.

38. A sliver knitting machine according to claim 35 wherein said bearing retainer includes inner and outer sections.

39. A sliver knitting machine according to claim 35 wherein said bearing retainer includes a plurality of arcuate sections.

40. A sliver knitting machine according to claim 35 wherein said bearing channel includes a widened access opening in which the wire races can be deflected for inserting and removing ball bearings from the retainer openings.

41. A sliver knitting machine according to claim 40 including means removably covering the bearing channel opening.

42. A sliver knitting machine according to claim 35 wherein said wire races have end portions confronting each other.

43. A sliver knitting machine according to claim 35 wherein said wire races include profiled surfaces engaging the ball bearings.

44. A sliver knitting machine according to claim 43 wherein said profiled surfaces of said wire races each form an arcuate groove having a radius greater than the ball bearing radius.

45. A bearing structure for resisting radial and tangential loads imparted thereon, and being positioned between an upper bed plate and mounting plate such as used for supporting a plurality of sliver feed assemblies in a circular sliver knitting machine, comprising a first mounting member and a second, movable member such as corresponding to a driving gear of a circular sliver knitting machine, said members being spaced from each other, said first and second members including confronting recesses forming a bearing channel, a bearing assembly mounted within said bearing channel for allowing said second member to move relative to said first mounting member, said bearing assembly comprising an upper and lower race wire extending circumferentially through each recess, a bearing retainer positioned within said bearing channel between upper and lower race wires, a plurality of openings formed in the retainer, and a ball bearing positioned in a plurality of the openings and engaging said wire races for rolling movement relative t said wire races as said second member is moved relative to said first mounting member and wherein said ball bearings and said wire races engaging said recesses provide resistance to radial forces generated by forcible movement of said second member relative to said first mounting member.

46. A bearing structure according to claim 45 wherein said bearing retainer includes inner and outer sections.

47. A bearing structure according to claim 45 wherein said bearing retainer includes a plurality of arcuate sections.

48. A bearing structure according to claim 45 wherein said recesses are substantially rectangular configured forming a substantially rectangular configured bearing channel.

49. A bearing structure according to claim 45 wherein said bearing channel includes a widened access opening in which the wire races can be deflected for inserting and removing ball bearings from the retainer openings.

50. A bearing structure according to claim 49 including means removably covering the bearing channel opening.

51. A bearing structure according to claim 45 wherein said wire races have end portions confronting each other.

52. A bearing structure according to claim 45 wherein said wire races include profiled surfaces engaging the ball bearings.

53. A bearing structure according to claim 52 wherein said profiled surfaces of said wire races each form an arcuate groove having a radius greater than the ball bearing radius.

54. A bearing structure according to claim 45 wherein said wire races are configured in a square when viewed in cross-section.

*55. A circular sliver knitting machine having increased carding capacity for increasing sliver to be carded and fed into said knitting machine, said sliver knitting machine comprising:*

*a frame;*

*a needle cylinder rotatably supported on said frame;*

*a plurality of needles supported in said needle cylinder for vertical movement parallel to an axis of rotation of said needle cylinder;*

*an upper bed plate fixed on said frame in surrounding relation to said needle cylinder, said upper bed plate having a pair of rigid annular dividers positioned radially outward from one another;*

*a mounting ring fixed on said upper bed plate;*

*a ring gear surrounding said mounting ring in spaced relation thereto;*

*forced air means for forcing air into said upper bed plate;*

*a sliver feed mounting plate secured to said upper bed forming a seal therebetween, said sliver feed mounting plate cooperating with said pair of annular dividers to form therebetween a mounting channel, an air jet channel, and a venting channel located between said mounting channel and said air jet channel, said sliver feed mounting plate defining a plurality of air discharge orifices communicating with said air jet channel for drawing air flowing into said upper bed plate out of said air jet channel and onto said knitting needles, and said sliver feed mounting plate further defining a plurality of air outlet orifices communicating with said venting channel for venting to atmosphere air leaking into said venting channel from said air jet channel;*

*an anti-friction bearing assembly engaged with said mounting ring and said ring gear allowing said ring gear to rotate relative to said mounting ring;*

*drive means connected to said ring gear for turning said ring gear; and*

*a plurality of sliver feed assemblies mounted on said sliver feed mounting plate and interconnected to said ring gear for carding and feeding sliver yarn to said knitting needles as said ring gear is turned.*

*56. A circular sliver knitting machine according to claim 55 wherein said air jet channel is positioned radially outwardly from said mounting channel.*

*57. A circular sliver knitting machine according to claim 55 wherein said mounting channel is adapted to contain oil for lubricating said bearing assembly.*

*58. A circular sliver knitting machine according to claim 55 wherein said plurality of air outlet orifices are located in general axial alignment with said venting channel.*

*59. A circular sliver knitting machine according to claim 55 wherein said venting channel has a generally smaller relative channel area than said mounting channel and said air jet channel.*

*60. A circular sliver knitting machine according to claim 55 further comprising a plurality of air jet mechanisms communicating with said plurality of air discharge orifices for forcing air drawn from said air jet channel onto said knitting needles; and*

*a discharge tube attached to said frame for discharaging air from the circular sliver knitting machine.*

*61. A circular sliver knitting machine according to claim 55 wherein said mounting channel, said air jet channel, and said venting channel each have an annular configuration.*

*62. An apparatus for use with a circular sliver knitting machine to protect an anti-friction bearing assembly used therein, said apparatus comprising:*

*an upper bed plate attached to the circular sliver knitting machine, said upper bed plate having a pair of annular dividers located radially outward from one another;*

*forced air means for forcing air into said upper bed plate; and*

*a sliver feed mounting plate secured to said upper bed plate forming a seal therebetween, said sliver feed mounting plate cooperating with said pair of annular dividers to form therebetween a mounting channel adapted to contain oil for lubricating the anti-friction bearing assembly, an air jet channel, and a venting channel located between said mounting channel and said air jet channel, said sliver feed mounting plate defining a plurality of air discharge orifices communicating with said air jet channel for drawing air forced into said upper bed plate out of said air jet channel, and said sliver feed mounting plate further defining a plurality of air outlet orifices communicating with said venting channel for venting to atmosphere air leaking into said venting channel from said air jet channel to prevent oil from leaking out of said mounting channel, thereby drying out and damaging the bearing assembly.*

*63. A circular sliver knitting machine according to claim 62 wherein said air jet channel is positioned radially outward from said mounting channel.*

*64. A circular sliver knitting machine according to claim 62 wherein said plurality of air outlet orifices are located in general axial alignment with said venting channel.*

*65. A circular sliver knitting machine according to claim 62 wherein said venting channel has a generally smaller relative channel area than said mounting channel and said air jet channel.*

*66. A method of increasing carding capacity of sliver to be carded and fed into a circular sliver knitting machine, said method comprising:*

*providing a frame;*

*supporting a needle cylinder rotatably on said frame;*

*supporting a plurality of needles in said needle cylinder for vertical movement parallel to an axis of rotation of said needle cylinder;*

*fixing an upper bed plate on said frame in surrounding relation to said needle cylinder, said upper bed plate having a pair of rigid annular dividers positioned radially outward from one another;*

*fixing a mounting ring on said upper bed plate;*

*providing a ring gear to surround said mounting ring in spaced relation thereto;*

*forcing air into said upper bed plate by forced air means;*

*securing a sliver feed mounting plate to said upper bed plate forming a seal therebetween, said sliver feed mounting plate cooperating with said pair of annular dividers to form therebetween a mounting channel, an air jet channel, and a venting channel located between said mounting channel and said air jet channel, said sliver feed mounting plate defining a plurality of air outlet orifices communicating with said venting channel for venting to atmosphere air leaking into said venting channel from said air jet channel;*

*engaging an anti-friction bearing assembly with said mounting ring and said ring gear allowing said ring gear to rotate relative to said mounting ring;*

*turning said ring gear with drive means connected thereto; and*

*mounting a plurality of sliver feed assemblies on said sliver feed mounting plate and interconnecting said ring gear for carding and feeding sliver yarn to said knitting needles as said ring gear is turned.*

*67. A method of protecting a bearing assembly of a circular knitting machine, said method comprising:*

*attaching an upper bed plate to the circular sliver knitting machine, said upper bed plate having a pair of annular dividers located radially outward from one another;*

*forcing air into said upper bed plate by forced air means; and*

*securing a sliver feed mounting plate to said upper bed plate forming a seal therebetween, said sliver feed mounting plate cooperating with said pair of annular dividers to form therebetween a mounting channel adapted to contain oil for lubricating the anti-friction bearing assembly, an air jet channel, and a venting channel located between said mounting channel and*

*said air jet channel, said sliver feed mounting plate defining a plurality of air discharge orifices communicating with said air jet channel for drawing air forced into said upper bed plate out of said air jet channel, and said sliver feed mounting plate further defining a plurality of air outlet orifices communicating with said venting channel for venting to atmosphere air leaking into said venting channel from said air jet channel to prevent oil from leaking out of said mounting channel, thereby drying out and damaging the bearing assembly.*

* * * * *

UNITED STATES PATENT AND TRADEMARK OFFICE

CERTIFICATE OF CORRECTION

PATENT NO. : Re. 35,130

DATED : December 26, 1995

INVENTOR(S) : Hanna

It is certified that error appears in the above-identified patent and that said Letters Patent is hereby corrected as shown below:

On title page, item [56], "References Cited" column 2, line 2, "Engelfield" should be -- Engelfried et al. --.

On title page, "Foreign Patent Documents" col. 2, line 1, "9/1981" should be -- 9/1961 --.

On the cover page, column 2, Foreign Patents, line 2, "11/1978" should be -- 11/1958 --.

On the cover page, column 2, Foreign Patents, line 3, "9/1981" should be -- 9/1961 --.

Column 5, line 21, delete ", Wildman".

Column 7, line 63, delete "can".

Column 8, line 7, after "an", delete "the".

Column 12, line 21, "t" should be -- to --.

Signed and Sealed this

Eleventh Day of June, 1996

Bruce Lehman

*Attest:*

BRUCE LEHMAN

*Attesting Officer*

*Commissioner of Patents and Trademarks*